US011113106B2

(12) United States Patent
Wang et al.

(10) Patent No.: US 11,113,106 B2
(45) Date of Patent: Sep. 7, 2021

(54) COORDINATING DISTRIBUTED TASK EXECUTION

(71) Applicant: Microsoft Technology Licensing, LLC, Redmond, WA (US)

(72) Inventors: Xu Wang, Mountain View, CA (US); Yurong Jiang, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 16/714,485

(22) Filed: Dec. 13, 2019

(65) Prior Publication Data
US 2021/0182102 A1    Jun. 17, 2021

(51) Int. Cl.
*G06F 9/46*    (2006.01)
*G06F 9/48*    (2006.01)
*G06F 9/50*    (2006.01)

(52) U.S. Cl.
CPC .......... *G06F 9/4887* (2013.01); *G06F 9/5027* (2013.01); *G06F 2209/501* (2013.01); *G06F 2209/508* (2013.01); *G06F 2209/5011* (2013.01); *G06F 2209/5022* (2013.01)

(58) Field of Classification Search
CPC ................. G06F 9/4887; G06F 9/5027; G06F 2209/501; G06F 2209/5011; G06F 2209/5022; G06F 2209/508
See application file for complete search history.

(56) References Cited

U.S. PATENT DOCUMENTS

| 7,565,651 B1 * | 7/2009 | Carey | G06F 9/4881 718/100 |
| 8,209,701 B1 * | 6/2012 | Roytman | G06F 9/5027 718/106 |
| 8,726,278 B1 * | 5/2014 | Shawver | G06F 9/4881 718/100 |

OTHER PUBLICATIONS

Dai, et al., "An Improved Task Assignment Scheme for Hadoop Running in the Cloud", In Journal of Cloud Computing: Advances, Systems and Applications, Dec. 18, 2013, pp. 1-16.
Nguyen, et al., "KOHA: Building a Kafka-Based Distributed Queue System on the Fly in a Hadoop Cluster", In IEEE 1st International Workshops on Foundations and Applications of Self* Systems, Sep. 12, 2016, pp. 48-53.

* cited by examiner

*Primary Examiner* — Diem K Cao
(74) *Attorney, Agent, or Firm* — Hickman Becker Bingham Ledesma LLP (57) ABSTRACT

The disclosed embodiments provide a system for coordinating distributed task execution. During operation, the system retrieves a first batch of tasks from multiple message queues in a distributed messaging system. Next, the system assigns the first batch of tasks to multiple task executors in a thread pool based on availabilities of the multiple task executors. The system also tracks statuses associated with processing the first batch of tasks based on communications from the multiple task executors. The system further periodically commits, based on the tracked statuses, offsets of completed tasks in the multiple message queues to the distributed messaging system.

20 Claims, 4 Drawing Sheets

COORDINATING DISTRIBUTED TASK EXECUTION

BACKGROUND

Field

The disclosed embodiments relate to task execution. More specifically, the disclosed embodiments relate to techniques for coordinating distributed task execution.

Related Art

Organizations with large numbers of users often store, process, and/or manage large volumes of data for the users. For example, an online network with hundreds of millions of members can maintain on the order of petabytes (PB) of data related to the members' profiles and/or activity. The online network also stores, processes, and serves content such as images, audio, video, and/or documents on behalf of the members. Such processing of content includes cropping, scaling, adding overlays to, applying filters to, or converting between formats in images; converting documents into a standardized format or representation; and/or cropping, scaling, transcoding, or generating thumbnails from video.

Such large-scale data processing is commonly performed in a distributed fashion using task queues and synchronized execution nodes. For example, a centralized controller assigns partitions or shards of tasks to multiple execution nodes distributed across one or more clusters. Each execution node executes assigned tasks in the order in which the tasks are ordered in a queue. After a given task is complete, the corresponding execution node commits the task and proceeds with executing the next task in the queue.

Such synchronized task execution can result in unnecessary delays and/or inefficiencies. Continuing with the above example, a task that is unable to complete in a timely fashion will block execution of subsequent tasks in the same queue. At the same time, network issues may prevent an execution node from committing tasks, which delays subsequent processing of tasks by the execution node. Consequently, large-scale distributed task execution may be improved by increasing the efficiency of consuming, processing, and committing tasks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for coordinating and managing the distributed execution of tasks. In these embodiments, tasks include units of work to be performed to achieve certain results. For example, tasks related to processing content in an online system include, but are not limited to, cropping, scaling, adding overlays to, applying filters to, or converting between formats in images; converting documents into a standardized format or representation; and/or cropping, scaling, transcoding, or generating thumbnails from video.

More specifically, distributed task execution is coordinated by a number of components in a non-blocking, efficient manner. The components include a single task poller that retrieves tasks from multiple message queues in a distributed messaging system. For example, the task poller executes as a single-thread process that periodically fetches a batch of tasks from a number of topics and/or partitions in the distributed messaging system.

The components also include multiple task executors that execute tasks retrieved by the task poller. For example, the task executors reside in one or more thread pools and interface with the task poller via a task queue. After the task poller retrieves a set of tasks from the distributed messaging system, the task poller adds the tasks to the task queue. When a task executor is available to process tasks, the task executor and/or a thread pool manager for the thread pool in which the task executor resides retrieve a task from the task queue, and the task executor executes the task. Once a task is completed (successfully or unsuccessfully), the task executor communicates the completion to one or more other components. If the task queue is full, the task poller is blocked from adding new tasks to the task queue.

The components further include an offset manager that tracks statuses of the tasks in the task queue and commits completed tasks to the distributed messaging system. For example, the offset manager maintains a mapping of each task in the task queue to a status of the task. When a task executor communicates the successful or unsuccessful completion of a task, the offset manager updates the status of the task to "completed" or "failed." The offset manager also periodically commits offsets of completed tasks to the distributed messaging system to signal that the tasks have been processed, thereby allowing the tasks to be removed from the distributed messaging system.

Finally, the components include a state manager that manages communication and/or coordination among other components. For example, the state manager connects message queues in the distributed messaging system to the task poller, offset manager, and/or other components. When a centralized controller adds a new message queue of tasks to the distributed messaging system, the state manager assigns the message queue to the task poller and offset manager to allow the tasks to be consumed and committed by the task poller and offset manager. In another example, the state manager provides the task queue that is used by the task poller to assign tasks to the task executors.

By separating and coordinating the consumption, execution, and completion of tasks across different components, the disclosed embodiments prevent latency, failures, restarts, and/or other issues in one component from blocking the execution of other components. As a result, the tasks are completed more quickly and/or efficiently than conventional techniques that use dedicated job runners or pipelines to process different partitions or shards of tasks. Consequently, the disclosed embodiments improve resource consumption, fault tolerance, configurability, and/or flexibility of computer systems, applications, tools, and/or frameworks for performing distributed task execution.

Coordinating Distributed Task Execution

Figure 1:
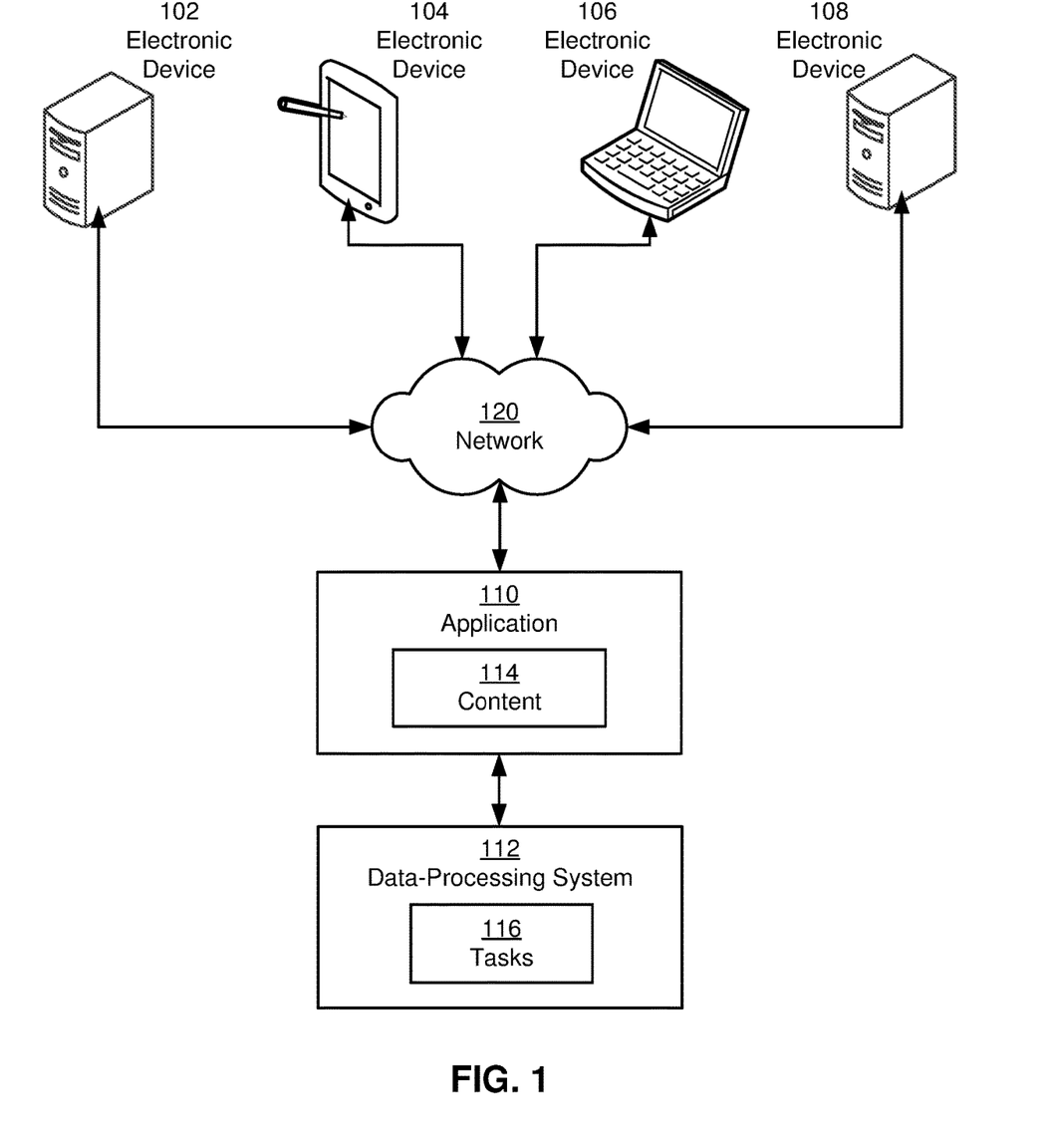
FIG. 1 shows a schematic of a system in accordance with the disclosed embodiments.

FIG. 1 shows a schematic of a system in accordance with the disclosed embodiments. As shown in FIG. 1, the system includes a data-processing system 112 that executes tasks 116 on behalf of an application 110.

In one or more embodiments, application 110 includes a web application, mobile application, native application, and/or another type of client-server application that is accessed over a network 120 via a number of electronic devices 102-108. Electronic devices 102-108 include, but are not limited to, personal computers (PCs), laptop computers, tablet computers, mobile phones, portable media players, workstations, servers, gaming consoles, smart home devices, sensor devices, and/or other network-enabled computing or electronic devices. Network 120 includes, but is not limited to, a local area network (LAN), wide area network (WAN), personal area network (PAN), virtual private network, intranet, cellular network, Wi-Fi network (Wi-Fi® is a registered trademark of Wi-Fi Alliance), Bluetooth (Bluetooth® is a registered trademark of Bluetooth SIG, Inc.) network, universal serial bus (USB) network, Ethernet network, and/or switch fabric.

During use of application 110, users of electronic devices 102-108 upload, download, share, view, and/or otherwise interact with content 114. For example, the users upload images, audio, video, documents, multimedia, and/or other content 114 to an online platform provided by application 110. The users can then use application 110 to perform editing and/or other processing of content 114, share the uploaded content 114 with other users of the online platform, and/or perform other tasks 116 related to content 114 and application 110.

In some embodiments, some or all tasks 116 related to content 114 and/or application 110 are executed using a distributed data-processing system 112. For example, tasks 116 related to content 114 include, but are not limited to, cropping, scaling, adding overlays to, applying filters to, or converting between formats in images; converting documents into a standardized format or representation; and/or cropping, scaling, transcoding, or generating thumbnails from video. When a task is requested by a user and/or generated in response to an action from a user (e.g., uploading content 114 to application 110), the task is added to a queue with other outstanding tasks 116. In turn, multiple nodes in data-processing system 112 concurrently execute the tasks in the queue and respond with status updates indicating the successful completion or failure to complete each task.

After the task is complete, the result of the task is delivered to the user requesting the task and/or other users of application 110. For example, an image or video uploaded by the user is served to the user's connections and/or followers within a user interface for application 110. As a result, the usability and/or value of application 110 to the users may depend on the timely processing of tasks 116 for the users by data-processing system 112.

Figure 2:
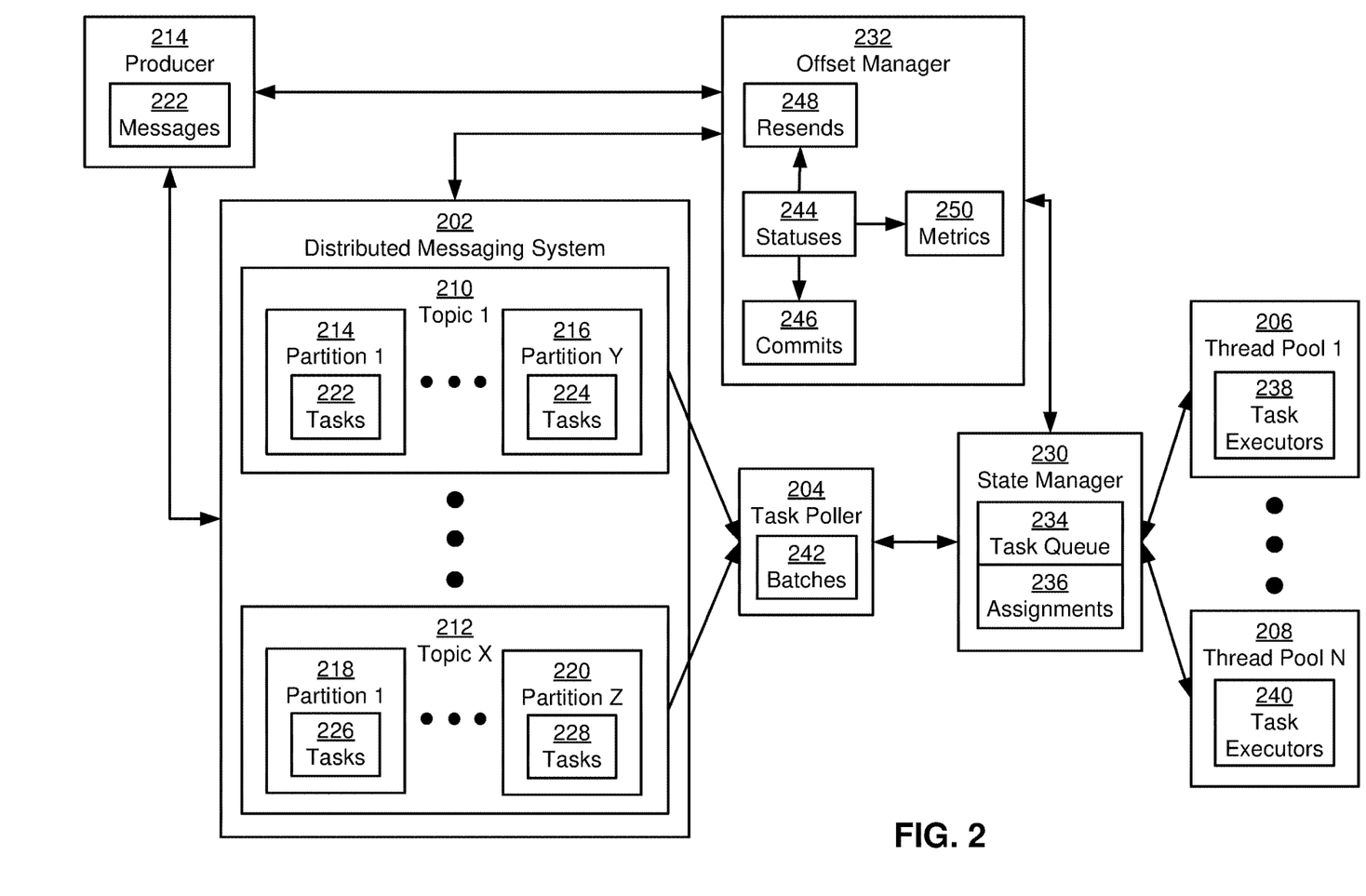
FIG. 2 shows a system for coordinating distributed task execution in accordance with the disclosed embodiments.

In one or more embodiments, data-processing system 112 includes functionality to coordinate the distributed execution of tasks 116 in an efficient, flexible, and/or fault-tolerant manner. As shown in FIG. 2, a system for managing task execution (e.g., data-processing system 112 of FIG. 1) includes a task poller 204, a state manager 230, an offset manager 232, and a number of task executors 238-240. Each of these components is described in further detail below.

Task poller 204 receives messages 222 containing tasks 222-228 to be executed from a number of message queues in a distributed messaging system 202. In some embodiments, the message queues are organized under topics (e.g., topic 1 210, topic x 212), as well as partitions into which data in each topic is divided (e.g., partition 1 214, partition y 216 for topic 1 210 and partition 1 218, partition z 220 for topic x 212). To read message from the message queues, task poller 204 is subscribed to the corresponding topics and/or partitions.

For example, distributed messaging system 202 includes a publish-subscribe messaging system. A producer 214 of messages 222 publishes messages 222 to one or more topics in the publish-subscribe messaging system. In turn, brokers in the publish-subscribe messaging system maintain partitions of the topic(s) and allow components subscribing to the topic(s) (e.g., task poller 204) to read messages 222 from message queues in the partitions. By decoupling transmission of messages 222 from producer 214 from receipt of messages 222 by task poller 204 and/or other consumers, the publish-subscribe messaging system allows topics, streams, producers, and/or consumers to be dynamically added, modified, and removed without interfering with the transmission and receipt of messages 222 using other topics, streams, producers, and/or consumers. Moreover, replication of partitions among brokers in the publish-subscribe messaging system increases the availability and/or consistency of messages 222.

In one or more embodiments, task poller 204 includes a single-thread process that scans topics, partitions, and/or message queues in distributed messaging system 202 for batches 242 of new tasks. For example, task poller 204 subscribes to topics containing tasks (e.g., tasks 222-228) that can be executed by task executors 238-240. When messages 222 containing new tasks are available, task poller 204 retrieves all available new tasks and/or a certain number of new tasks from the corresponding message queues and adds the tasks to a task queue 234 provided by state manager 230. Task poller 204 also, or instead, scans topics to which it is subscribed on a periodic and/or on-demand basis (e.g., when task executors 238-240 signal availability to process tasks). If task queue 234 is full, task poller 204 is blocked from adding more tasks to task queue 234.

After task poller 204 populates task queue 234 with one or more batches 242 of tasks (e.g., tasks 222-228), task executors 238-240 fetch the tasks from task queue 234 and execute the tasks. For example, each task executor is configured to retrieve a task from the head of task queue 234 and perform processing to execute the task. After the task is complete, the task executor repeats the process until task queue 234 is empty.

In one or more embodiments, tasks 222-228 in message queues of distributed messaging system 202 and/or task queue 234 pertain to different types of processing. For example, messages 222 generated by producer 214 specify various types of tasks related to images, video, audio, documents, and/or other types of content. In turn, each task executor includes functionality to perform different types of processing and/or process different types of content. As a result, the same set of resources can be used to perform multiple types of tasks instead of allocating different sets of resources and/or using dedicated execution nodes to process different types of tasks or content.

To facilitate concurrent execution of tasks in task queue 234, some embodiments organize task executors 238 under one thread pool (e.g., thread pool 1 206) and task executors 240 under another thread pool (e.g., thread pool n 208). For example, each thread pool is created on a separate physical and/or virtual host. Each thread pool also includes a thread pool manager, along with multiple threads that act as task executors (e.g., task executors 238-240). When a thread is available (e.g., when the thread is not currently executing a task), the thread pool manager fetches a task from the front of task queue 234 and assigns the task to the thread. After the thread successfully or unsuccessfully completes the task, the thread and/or thread pool manager notify state manager 230 and/or other components of the system of the completion.

Because task executors 238 are created as threads in one or more thread pools, the number of threads in each thread pool can be adjusted by the corresponding thread pool manager based on resource limits, workload, and/or other factors. Moreover, the thread pool manager can monitor resource consumption by the threads and kill individual threads that excessively consume resources to ensure the successful and efficient execution of other threads in the same thread pool.

Offset manager 232 tracks statuses 244 of tasks retrieved by task poller 204 from distributed messaging system 202. For example, offset manager 232 maintains in-memory mappings of the tasks to the corresponding statuses 244. When a task is retrieved by task poller 204 from distributed messaging system 202, offset manager 232 creates a mapping for the task and sets the corresponding status to "pending." After a task executor begins executing the task, the task executor and/or a corresponding thread pool manager generate a communication indicating the current execution of the task, and offset manager 232 updates the status to "running" When the task executor successfully or unsuccessfully completes the task, the task executor and/or thread pool manager generate another communication of the completion, and offset manager 232 updates the status to "complete" or "failed."

Offset manager 232 also uses statuses 244 to manage commits 246 of tasks to distributed messaging system 202. In one or more embodiments, offset manager 232 periodically performs commits 246 of offsets of tasks in message queues of distributed messaging system 202 to indicate that the tasks have been completed. For example, when task executors 238-240 have completed a series of tasks represented by sequential offsets that immediately follow the last-committed offset in a message queue, offset manager 232 commits the highest offset associated with the series of tasks in the message queue to distributed messaging system 202 to indicate that all messages up to the committed offset have been processed. In turn, distributed messaging system 202 is able to remove committed tasks from the corresponding message queues, which allows producer 214 to add new messages 222 to the message queues.

In some embodiments, offset manager 232 includes functionality to commit a series of tasks without requiring all tasks in the series to be complete. For example, offset manager 232 commits the latest processed offset in a message queue after a certain number of tasks with sequential offsets (e.g., 5, 10, etc.), up to the latest processed offset, have completed. When one or more pending tasks are blocking the completion of a given series of tasks, offset manager 232 requests resends 248 of the pending task(s) from producer 214 and commits the highest offset in the series of tasks to the corresponding message queue in distributed messaging system 202. In turn, producer 214 performs resends 248 of messages 222 containing the pending task(s) to distributed messaging system 202, which allows records of the pending task(s) to be maintained by task poller 204, offset manager 232, and/or other components until the pending tasks are completed.

Offset manager 232 also, or instead, uses statuses 244 to calculate metrics 250 indicating the performances of task executors 238-240. For example, offset manager 232 calculates the number of tasks processed by each task executor over a given period (e.g., one minute, five minutes, etc.), the task executor's average per-task processing time (e.g., for different types of tasks and/or all types of tasks), the distribution of task types processed by the task executor, the success rate of the task executor, and/or the failure rate of the task executor. Offset manager 232 then outputs the calculated metrics 250 to distributed messaging system 202 and/or other components. In turn, developers and/or administrators of the system can use metrics 250 to assess the performance of the system and/or individual task executors 238-250, diagnose errors or issues in the system, and/or adjust resources available for use by the system.

State manager 230 coordinates communication among other components of the system and/or manages execution of the components. First, state manager 230 provides task queue 234, which allows task poller 204 to communicate tasks 222-228 from distributed messaging system 202 to task executors 238-240 that can perform tasks 228-228, as discussed above.

Second, state manager 230 propagates statuses 244 of pending tasks from task executors 238-240 to offset manager 232. For example, task executors 238-240 transmit messages indicating statuses 244 of tasks to state manager 230. In turn, state manager 230 relays the messages to offset manager 232, and offset manager 232 updates in-memory mappings of the tasks with the communicated statuses 244. Alternatively, state manager 230 is not required to relay statuses 244 of tasks from task executors 238-240 to offset manager 232 if task executors 238-240 are capable of communicating directly with offset manager 232.

Third, state manager 230 manages assignments 236 of task poller 204, offset manager 232, and/or other components to topics and/or partitions of tasks 222-228 in distributed messaging system 202. For example, when a centralized controller (not shown), producer 214, and/or another component add a new topic or partition containing messages 222 related to tasks to distributed messaging system 202, the component transmits a message communicating the new topic or partition to state manager 230. State manager 230 subsequently updates assignments 236 so that task poller 204 and offset manager 236 are subscribed to the topic or partition. Conversely, when the component removes a topic or partition from distributed messaging system 202, the component transmits a message communicating the removed topic or partition to state manager 230, and state manager 230 removes subscriptions of task poller 204 and offset manager 232 to the topic or partition. Task poller 204 then removes tasks from the topic or partition that are not currently running from task queue 234, and offset manager 232 waits for currently executing tasks from the topic or partition to complete before committing offsets of completed tasks in the topic or partition to distributed messaging system 202.

By separating and coordinating the consumption, execution, and completion of tasks 222-228 across task poller 204, state manager 230, offset manager 232, and task executors 238-240, the system of FIG. 2 prevents latency, failures, restarts, and/or other issues in one component from blocking the execution of other components. As a result, tasks 222-228 are completed more quickly and/or efficiently than conventional techniques that use dedicated job runners or pipelines to process different partitions or shards of tasks. Consequently, the disclosed embodiments improve resource consumption, fault tolerance, configurability, and/or flexibility of computer systems, applications, tools, and/or frameworks for performing distributed task execution.

Those skilled in the art will appreciate that the system of FIG. 2 may be implemented in a variety of ways. First, distributed messaging system 202, producer 214, task poller 204, state manager 230, offset manager 232, and task executors 238-240 may be provided by a single physical machine, multiple computer systems, one or more virtual machines, a grid, one or more clusters, one or more databases, one or more filesystems, and/or a cloud computing system. Task poller 204, state manager 230, offset manager 232, and/or task executors 238-240 may be implemented together and/or separately by one or more hardware and/or software components and/or layers.

Second, task poller 204, state manager 230, offset manager 232, and/or task executors 238-240 may be created and/or instantiated to scale with the complexity, volume, and/or types of tasks 222-228 to be executed and/or the acceptable latency in processing tasks 222-228. For example, task executors 238-240 may be configured to run on individual processor cores, processors, virtual machines, and/or physical machines. In another example, instances of task poller 204, state manager 230, offset manager 232, and/or task executors 238-240 may be deployed on multiple clusters to increase throughput and/or reduce latency in executing tasks 222-228.

Figure 3:
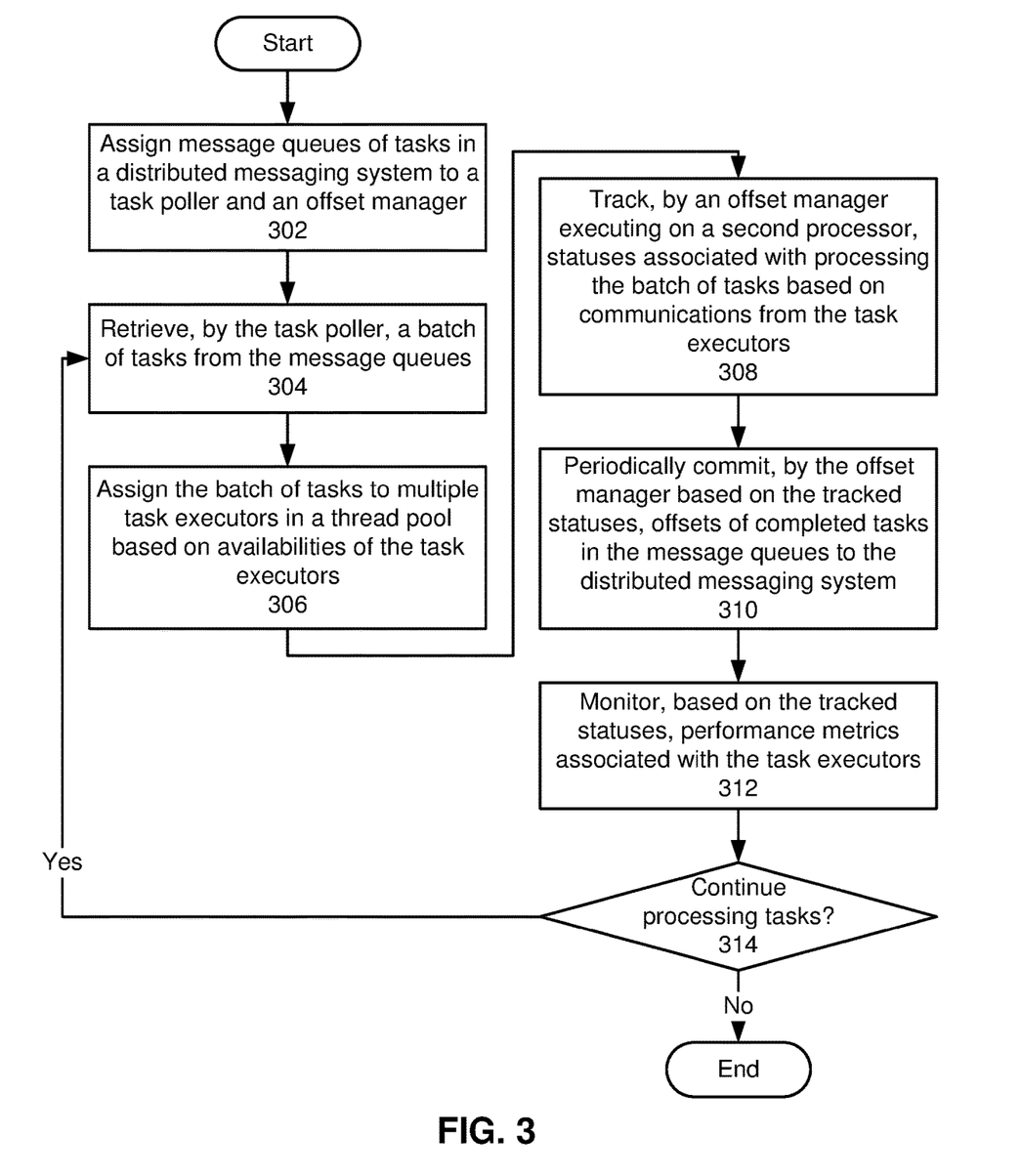
FIG. 3 shows a flowchart illustrating a process of coordinating distributed task execution in accordance with the disclosed embodiments.

FIG. 3 shows a flowchart illustrating a process of coordinating distributed task execution in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, message queues of tasks in a distributed messaging system are assigned to a task poller and an offset manager (operation 302). For example, the message queues include partitions of topics in a publish-subscribe messaging system. A producer publishes messages containing tasks to the topics and partitions, and a state manager subscribes the task poller and offset manager to the topics and partitions to allow the task poller and offset manager to receive the tasks and manage the execution of the tasks.

Next, a batch of tasks is retrieved from the message queues by the task poller (operation 304). For example, the task poller executes as a persistent single-thread process that scans topics and partitions to which the task poller is assigned for new tasks on a periodic and/or on-demand basis. When new tasks are found, the tasks are read in a batch from the corresponding message queue(s) by the task poller.

The batch of tasks is assigned to multiple task executors in a thread pool based on availabilities of the task executors (operation 306). For example, the task poller adds the batch of tasks to a task queue provided by the state manager. When a task executor is available, a task (e.g., the first task) in the task queue is assigned to the task executor and removed from the task queue. When the task queue is full, the addition of tasks to the task queue by the task poller is blocked.

While the tasks are pending in the task queue, statuses associated with processing the batch of tasks are tracked by an offset manager based on communications from the task executors (operation 308). For example, the offset manager maintains in-memory mappings of tasks in the task queue to statuses of the tasks. When a task executor starts executing a task, the task executor communicates the beginning of the execution to the state manager and/or offset manager. In turn, the offset manager updates the mapping for the task with an identifier for the task executor and/or an indication that the task is currently running. When the task executor completes the task, the task executor communicates the successful or unsuccessful execution of the task as "complete" or "failed" to the state manager and/or offset manager. The offset manager then updates the task's mapping to indicate the corresponding state of completion.

The offset manager also periodically commits offsets of completed tasks in the message queues to the distributed messaging system (operation 310). For example, after the task executors complete a series of tasks represented by sequential offsets that immediately follow the last-committed offset in a message queue, the offset manager commits the highest offset associated with the series of tasks in the message queue. When a pending task blocks completion of the series of tasks, the offset manager notifies a producer of messages in the message queue to resend a message representing the pending task and commits the highest offset associated with the series of tasks in the message queue.

The offset manager and/or another component also monitor performance metrics associated with the task executors based on the tracked statuses (operation 312). For example, the component calculates a number of tasks processed, a failure rate, and/or a success rate of each task executor. The component also outputs the calculated values to allow the performance of individual task executors and/or one or more groups of task executors to be evaluated.

Operations 302-312 may be repeated while tasks are being processed (operation 314). For example, the task poller continues to retrieve batches of tasks from message queues (operation 304) and assign the tasks to the task executors (operation 306) while the tasks are added to the message queues. In turn, the offset manager and/or another component track statuses associated with the tasks (operation 308), perform batch commits of task offsets to the distributed messaging system (operation 310), and monitor performance metrics associated with the task executors (operation 312). Such distributed processing of tasks may be performed until the task poller, offset manager, task executors, and/or state manager are no longer used to coordinate and/or carry out task execution.

Figure 4:
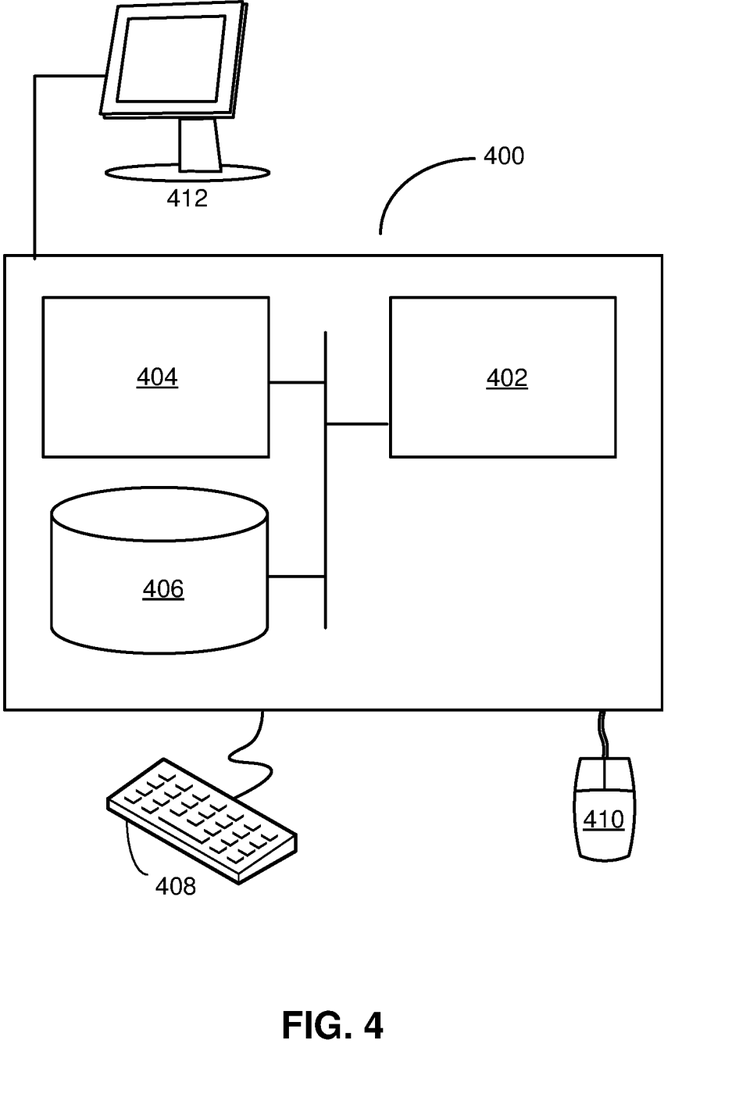
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 includes functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications obtain the use of hardware resources on computer system 400 from the operating system, as well as interact with the user through a hardware and/or software framework provided by the operating system.

In one or more embodiments, computer system 400 provides a system for coordinating distributed task execution. The system includes a task poller, an offset manager, and multiple task executors, one or more of which may alternatively be termed or implemented as a module, mechanism, or other type of system component. The task poller retrieves a first batch of tasks from multiple message queues in a distributed messaging system. Next, the task poller assigns the first batch of tasks to multiple task executors in a thread pool based on availabilities of the multiple task executors. The offset manager tracks statuses associated with processing the first batch of tasks based on communications from the multiple task executors. The offset manager also periodically commits, based on the tracked statuses, offsets of completed tasks in the multiple message queues to the distributed messaging system.

In addition, one or more components of computer system 400 may be remotely located and connected to the other components over a network. Portions of the present embodiments (e.g., distributed messaging system, producer, task poller, state manager, offset manager, thread executors, thread pools, etc.) may also be located on different nodes of a distributed system that implements the embodiments. For example, the present embodiments may be implemented using a cloud computing system that coordinates and/or manages the execution of remote tasks.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
    retrieving, by a task poller executing on a first processor, a first batch of tasks from multiple message queues in a distributed messaging system;
    assigning, by the task poller, the first batch of tasks to multiple task executors in a thread pool based on availabilities of the multiple task executors;
    tracking, by an offset manager executing on a second processor, statuses associated with processing the first batch of tasks based on communications from the multiple task executors; and
    periodically committing, by the offset manager based on the tracked statuses, offsets of completed tasks in the multiple message queues to the distributed messaging system;
    wherein periodically committing the offsets of the completed tasks in the multiple message queues to the distributed messaging system comprises:
        when a pending task blocks completion of a series of tasks represented by sequential offsets that immediately follow a last-committed offset in a message queue:
            notifying a producer of messages in the message queue to resend a message representing the pending task; and
            committing, to the distributed messaging system, a highest offset associated with the series of tasks in the message queue.

2. The method of claim 1, further comprising:
    monitoring, based on the tracked statuses, performance metrics associated with the multiple task executors.

3. The method of claim 2, wherein the performance metrics comprise at least one of:
    a number of tasks processed;
    a failure rate; or
    a success rate.

4. The method of claim 1, further comprising:
    retrieving, by the task poller, a second batch of tasks from the multiple message queues after one or more of the offsets of the completed tasks are committed by the offset manager; and
    assigning the second batch of tasks to the multiple task executors.

5. The method of claim 1, further comprising:
    upon creating a new message queue of tasks in the distributed messaging system, assigning the new message queue to the task poller and the offset manager.

6. The method of claim 1, wherein assigning the first batch of tasks to the multiple task executors based on the availabilities of the multiple task executors comprises:
    adding the first batch of tasks to a task queue; and
    when a task executor in the multiple task executors is available, assigning a task in the task queue to the task executor and removing the assigned task from the task queue.

7. The method of claim 6, wherein assigning the first batch of tasks to the multiple task executors based on the availabilities of the multiple task executors further comprises:
    when the task queue is full, blocking the addition of tasks to the task queue by the task poller.

8. The method of claim 1, wherein periodically committing the offsets of the completed tasks in the multiple message queues to the distributed messaging system comprises:

after completion of a second series of tasks represented by sequential offsets that immediately follow a second last-committed offset in the message queue, committing a highest offset associated with the second series of tasks in the message queue.

9. The method of claim 1, wherein the first batch of tasks comprises a first task for processing a first type of content and a second task for processing a second type of content.

10. The method of claim 9, wherein the first and second types of content comprise at least one of:
   images;
   video; or
   documents.

11. The method of claim 1, wherein the statuses comprise at least one of:
   pending;
   running;
   complete; or
   failed.

12. A system comprising:
   one or more processors; and
   memory storing instructions that, when executed by the one or more processors, cause the system to:
      retrieve, by a single-thread process, a first batch of tasks from multiple message queues in a distributed messaging system;
      assign the first batch of tasks to multiple task executors in a thread pool based on availabilities of the multiple task executors;
      track statuses associated with processing the first batch of tasks based on communications from the multiple task executors; and
      periodically commit, based on the tracked statuses, offsets of completed tasks in the multiple message queues to the distributed messaging system
      wherein periodically committing the offsets of the completed tasks in the multiple message queues to the distributed messaging system comprises:
         when a pending task blocks completion of a first series of tasks represented by sequential offsets that immediately follow a last-committed offset in a message queue:
            notifying a producer of messages in the message queue to resend a message representing the pending task; and
            committing, to the distributed messaging system, a highest offset associated with the first series of tasks in the message queue.

13. The system of claim 12, wherein the memory further stores instructions that, when executed by the one or more processors, cause the system to:
   monitor, based on the tracked statuses, performance metrics associated with the multiple task executors.

14. The system of claim 13, wherein the performance metrics comprise at least one of:
   a number of tasks processed;
   a failure rate; or
   a success rate.

15. The system of claim 12, wherein assigning the first batch of tasks to the multiple task executors based on the availabilities of the multiple task executors comprises:
   adding the first batch of tasks to a task queue; and
   when a task executor in the multiple task executors is available, assigning a task in the task queue to the task executor and removing the assigned task from the task queue.

16. The system of claim 15, wherein assigning the first batch of tasks to the multiple task executors based on the availabilities of the multiple task executors further comprises:
   when the task queue is full, blocking the addition of tasks to the task queue by the task poller.

17. The system of claim 12, wherein periodically committing the offsets of the completed tasks in the multiple message queues to the distributed messaging system comprises:
   after completion of a second series of tasks represented by sequential offsets that immediately follow a second last-committed offset in the message queue, committing a highest offset associated with the second series of tasks in the message queue.

18. The system of claim 12, wherein the memory further stores instructions that, when executed by the one or more processors, cause the system to:
   retrieve, by the task poller, a second batch of tasks from the multiple message queues after one or more of the offsets of the completed tasks are committed by the offset manager; and
   assign the second batch of tasks to the multiple task executors.

19. The system of claim 12, wherein the memory further stores instructions that, when executed by the one or more processors, cause the system to:
   upon creating a new message queue of tasks in the distributed messaging system, assign the new message queue to the task poller and the offset manager.

20. A non-transitory computer-readable storage medium storing instructions that when executed by a computer cause the computer to perform a method, the method comprising:
   retrieving, by a single-thread process, a first batch of tasks from multiple message queues in a distributed messaging system;
   assigning the first batch of tasks to multiple task executors based on availabilities of the multiple task executors;
   tracking statuses associated with processing the first batch of tasks based on communications from the multiple task executors; and
   periodically committing, based on the tracked statuses, offsets of completed tasks in the multiple message queues to the distributed messaging system;
   wherein periodically committing the offsets of the completed tasks in the multiple message queues to the distributed messaging system comprises:
      when a pending task blocks completion of a series of tasks represented by sequential offsets that immediately follow a last-committed offset in a message queue:
         notifying a producer of messages in the message queue to resend a message representing the pending task; and
         committing, to the distributed messaging system, a highest offset associated with the series of tasks in the message queue.

* * * * *